United States Patent [19]

Gessner et al.

[11] Patent Number: 5,533,882
[45] Date of Patent: Jul. 9, 1996

[54] HOT RUNNER VALVE GATED SYSTEM

[75] Inventors: Dieter Gessner, Karben; Martin Osterode, Runsel, both of Germany

[73] Assignee: Husky Injection Molding Systems Ltd., Canada

[21] Appl. No.: 346,376

[22] Filed: Nov. 29, 1994

[51] Int. Cl.$^6$ ................................................ B29C 45/23
[52] U.S. Cl. .................... 425/564; 264/328.9; 425/566
[58] Field of Search .................................. 425/549, 562, 425/563, 564, 565, 566; 264/328.9

[56] References Cited

U.S. PATENT DOCUMENTS

| | | | |
|---|---|---|---|
| 4,657,496 | 4/1987 | Ozeki et al. | 425/564 |
| 5,013,235 | 5/1991 | Friderich | 425/564 |
| 5,387,099 | 2/1995 | Gellert | 425/564 |

OTHER PUBLICATIONS

Hackh's Chemical Dictionary, 1969, pp. 142, 682, 683.

*Primary Examiner*—Tim Heitbrink
*Attorney, Agent, or Firm*—Bachman & LaPointe

[57] ABSTRACT

A hot runner valve gated system comprising at least one nozzle housing adapted to be positioned in a manifold plate. The nozzle housing includes a gate orifice and a reciprocal valve stem positioned therein. The system also includes a mechanism for moving the valve stem for opening and closing the gate valve and is designed to maintain the mechanism for moving the valve stem in a substantially cooled state. The mechanism for moving stem is positioned coaxially relative to the nozzle housing.

22 Claims, 5 Drawing Sheets

HOT RUNNER VALVE GATED SYSTEM

BACKGROUND OF THE INVENTION

This invention relates to hot runner valves, and more particularly, to hot runner valves designed for cooling the motive mechanism thereof during the operation of the valve.

Hot runner systems can be categorized into two types with respect to the method of closing off the mold cavity injection gate. These types include a thermally closed gate and a mechanically closed gate. This invention relates to mechanical or valve gate closing mechanisms for use in multi-cavity or high cavitation molds and molding systems as well as single cavity molds. Typically, a valve gated actuating mechanism is a unitized device which is attached to a valve stem or other commonly known gate closing component. Accordingly, valve stem actuation devices typically consume a considerable amount of space within a mold platen. As a result of such large space consumption, molds are formed which are too large for typical injection molding machine, resulting in increased expense due to the necessity to use larger and more materials for producing a larger mold to accommodate the mechanism.

Such a scenario typically arises when a valve gated hot runner system is desired for a multi-level or stack mold. Most valve gated actuation mechanisms assume a large space which would be better used for an opposing injection nozzle housing arrangement. Such is the case for typical mechanically actuated closed gate mechanisms and a typical thermally activated closed gate mechanisms. In comparing two such mechanisms, it is obvious that the mechanically closed gate is generally significantly larger than the thermally closed gate. Accordingly, it would be beneficial in the art to design a mechanically actuated closed gate system of a size comparable to thermally closed gate systems.

German patent 1,133,880 shows a nozzle suitable for attachment to the end of an injection molding machine extruder. The actuating mechanism used to move the valve stem in reciprocating fashion is shown as an annular piston, where a pressurized fluid is employed as the motive force. As with all piston type actuators, it is necessary to provide resilient seals which serve to prevent pressure leak from the pressurized chambers on both sides of piston, so that maximum force is transferred to the piston. Additionally, pressurized fluid leakage can lead to, wasting energy or fluid substance; creating undesirable noise; fire hazards; and undesirable cooling effects on the hot melt conveying components adjacent to it. The resilient seals for this nozzle design must be of a very high temperature capability.

Plastic conveying equipment, such as that described in the German patent, often needs to operate at temperatures well over 500° F. Resilient seals which can survive in such an environment for desirable periods of time are either unavailable or require that a more complex, multiple-piece piston design be used. Additionally, such seals are prohibitively expensive and will not provide a 100% seal over extended periods of time. Although the German patent does not show or describe the method of piston sealing, it is presumed that it suffers from the sealing/leaking problems as discussed above.

U.S. Pat. No. 4,082,226 shows another gate valve actuating mechanism. An annular piston of complex and bulky design is used, which includes many parts requiring high manufacturing expense and laborious assembly time. By necessity, the piston seals must withstand a very high temperature to provide prolonged service next to the hot medial portion of the nozzle. The very bulky piston design, because of its ratio of height to diameter, is prone to cocking and jamming should one of the piston posts 50 show resistance to slide due to sticking or friction. Also, as seen in FIG. 7 of the patent, the valve stem 66 must hit the outlet bore 71 to stop travel of the stem. Such contact can lead to undesirable wear and possibly the damage of the bore and front nozzle portion.

U.S. Pat. No. 4,443,178 shows a compact method of actuating a valve stem using a spring, as shown in FIG. 8. However, this method relies on plastic pressure to push the valve stem back and the spring pressure is not readily adjustable with respect to force or time desired of the stem to close the gate. A pressurized piston is far superior in its ability to readily vary stem force as well as permit actuation of the stem while pressure still exists in the system or delay closing of the stem even after pressure has been released.

U.S. Pat. No. 4,832,593 shows a design similar to the aforementioned patent, but where the motive means, in this case an air piston, is not annular in shape. The piston is solid and is positioned on the center axis and directly behind the nozzle housing. Because the piston resides within the heated body used to convey plastic melt to the nozzle housing, it requires a cast iron piston ring as a sealing device to withstand the high temperatures. Such metal-on-metal dynamic seals inherently do not provide 100% sealing efficiency and thereby are not capable of allowing maximum supply pressure to act on the piston face. Also, it can be seen from FIG. 1 that the nozzle body is necessarily much larger in diameter than the nozzle itself and the axial length of the nozzle and nozzle body together is extended, due to the internal space required to provide the piston assembly.

All of the above cited patents are not adaptable for use inside an injection mold frame, especially in a mold where molding cavity spacing is dense, so as to maximize production output from the molding tool. Nor do they permit the design of a multi-level or stack mold with a minimum mold open distance, compatible with standard injection machines. Also, the prior art does not disclose an appropriate piston assembly design or piston seal which overcomes leaking, wear or attrition in a very hot environment.

There exists, therefore, a need in the injection molding art for a mechanically actuated valve gated system which is self-cooling and space efficient.

SUMMARY OF THE INVENTION

The primary object of this invention is to provide a space efficient mechanically actuated valve gated system.

Another object of this invention is to provide a mechanically actuated valve gated system which is self-cooling so as to reduce wear of heat sensitive parts.

Yet another object of this invention is to provide a mechanically actuated valve gated system which functions to alleviate weld lines.

Still another object of this invention is to provide a mechanically actuated self-cooling valve gated system having a motive means coaxially positioned relative the nozzle housing for acquiring a space efficient design.

And still another object of this invention is to provide a valve gated system which is particularly useful for stack mold arrangements due to the space efficient design thereof.

The foregoing objects are obtained by the inventive hot runner valve gated system of the present invention which comprises at least one nozzle housing adapted to be positioned in a manifold plate. The nozzle housing includes a gate orifice and a reciprocal valve stem positioned therein. The system also includes means for moving the valve stem for opening and closing the gate valve and is designed to maintain the means for moving the valve stem in a substantially cooled state. The means for moving the valve stem is preferably positioned coaxially relative to the nozzle housing.

In one embodiment of the invention, the piston is substantially cylindrical having a wall with an inner diameter adjacent the nozzle housing. The wall includes an opening therein adapted to engage a stop for terminating the piston stroke. In the same embodiment, and during the opening of the valve system, the piston stroke is of a distance which substantially removes the valve stem from the flow path of the molding material such that weld lines are not formed. This embodiment also includes means for creating a seal between the piston and the manifold plate, wherein the means for cooling is also adapted to cool the means for creating a seal.

The details of the present invention are set out in the following description and drawings wherein like reference characters depict like elements.

DETAILED DESCRIPTION OF THE PREFERRED EMBODIMENT

Figure 1:
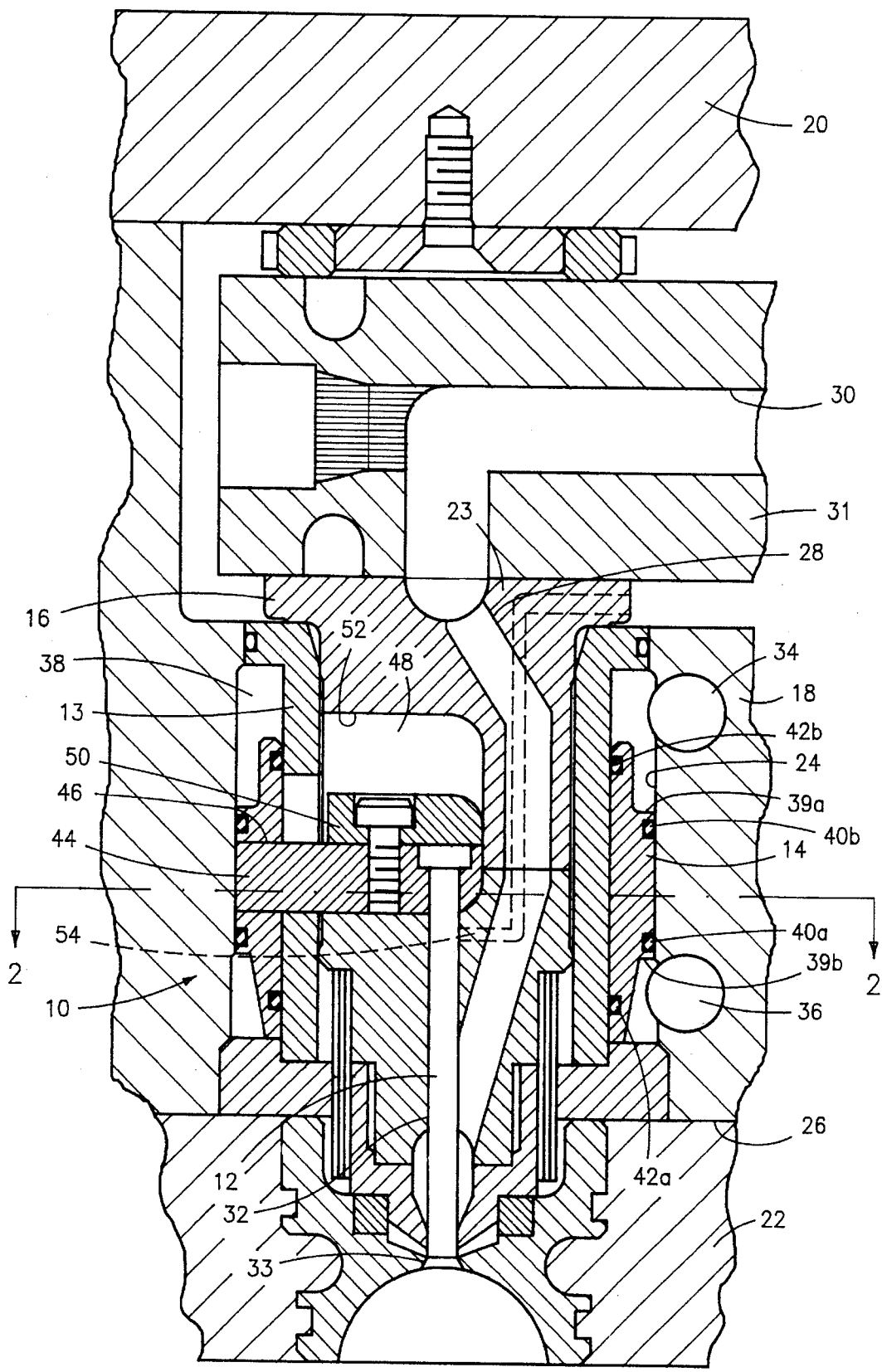
FIG. 1 is an overhead and cross-sectional view of the valve gated system of the present invention.

Referring now to the drawings in detail, there is shown in FIG. 1 an overhead cross-sectional view of the hot runner gate valve system of the present invention, designated generally as 10. The valve gated system 10 generally includes a valve stem 12, a sleeve 13, a cylindrical piston 14 and a nozzle housing 16. System 10 is adapted to be positioned within a mold plate, as mold manifold plate 18, sandwiched between manifold backup plate 20 and mold plate 22.

Mold manifold plate 18 includes a bore 24 therein for receiving valve gated system 10 of the present invention. Bore 24 has a diameter for slidably engaging the outer surface of cylindrical piston 14. The inner surface of cylindrical piston 14 slidably engages the outer surface of cylindrical sleeve 13, and nozzle housing 16 is positioned coaxially within sleeve 13. Nozzle housing 16 extends outwardly from surface 26 of mold manifold plate 18 adjacent mold plate 22, extending partially into mold plate 22.

Figure 2:
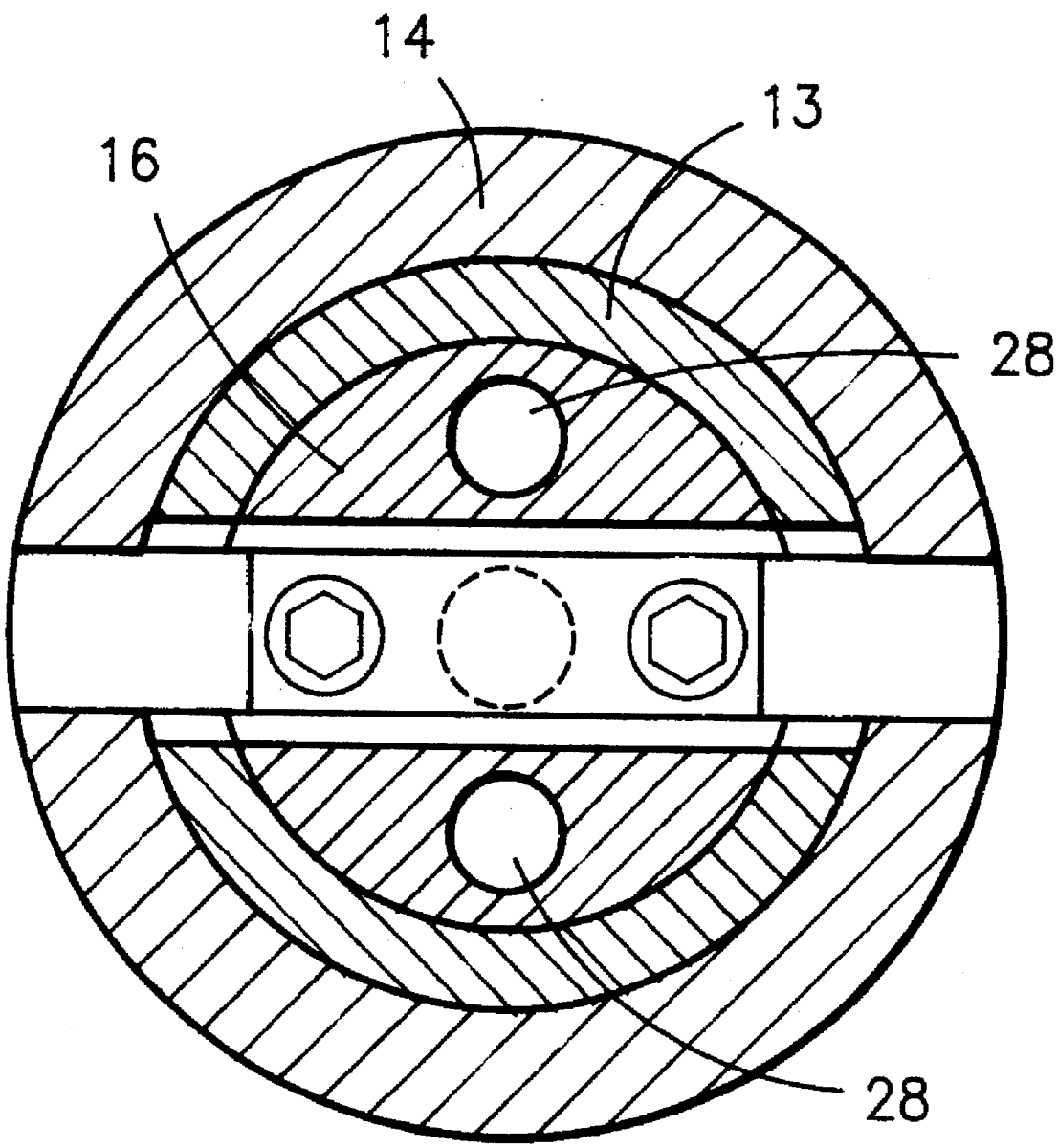
FIG. 2 is a cross-sectional view taken through line 2—2 of FIG. 1.
Figure 3:
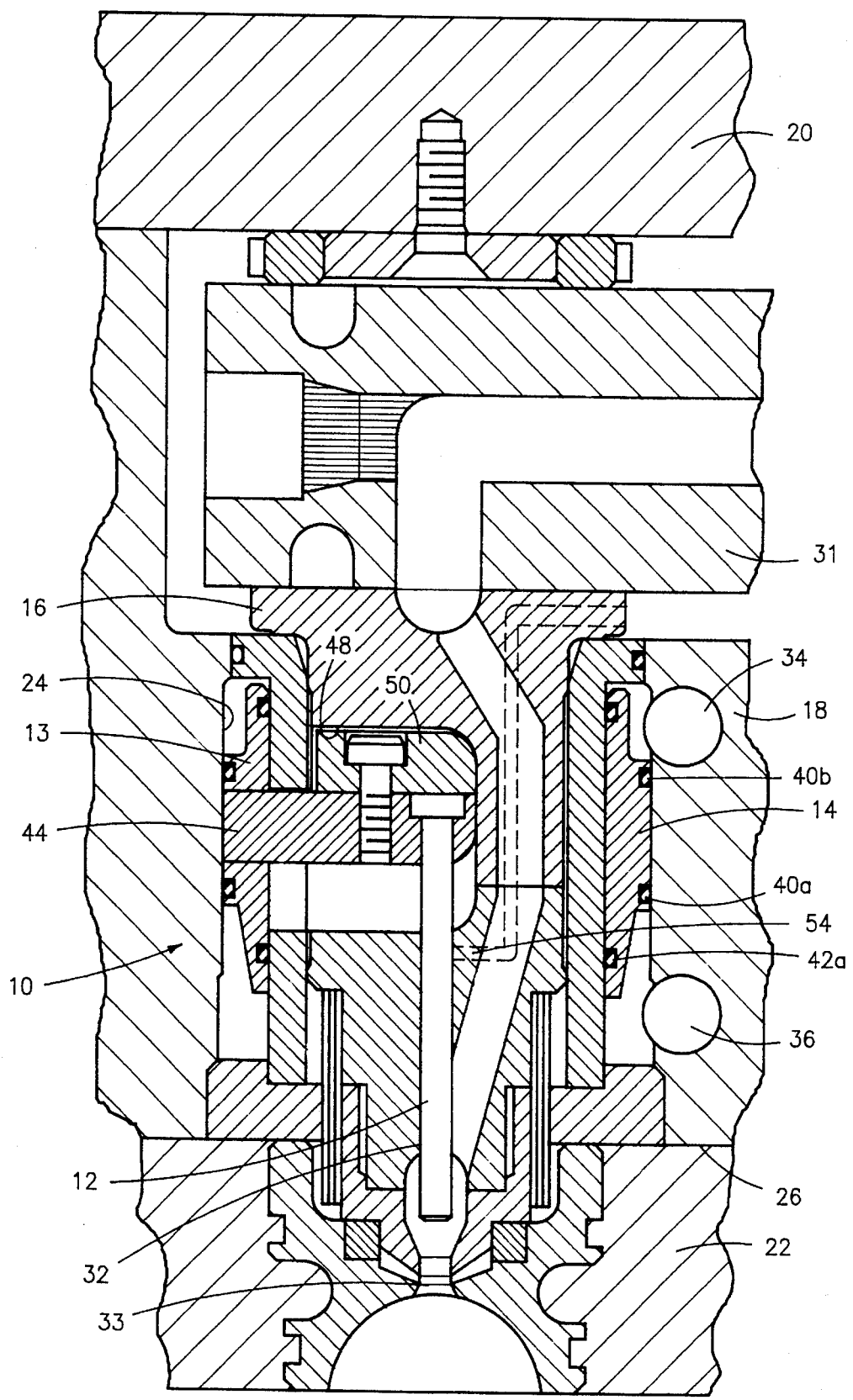
FIG. 3 is an overhead and cross-sectional view of the valve gated system of the present invention shown in the open position.

Referring to FIGS. 1 and 2, nozzle housing 16 is essentially an elongated rod shaped member having a base portion 23 adapted to be fastened inside mold manifold plate 18. Nozzle housing 16 includes at least one channel 28, preferably two as shown in FIG. 2, extending therethrough and in communication with melt flow channel 30 located in hot runner manifold 31. Channel 28 extends substantially the length of nozzle housing 16 and converges with channel 32, which runs longitudinally in nozzle housing 16, and guides valve stem 12. Channel 28 and valve stem channel 32 converge toward the end of nozzle 16 adjacent mold plate 22. With valve stem 12 in the closed position as shown in FIG. 1, the end of valve stem 12 blocks the flow of molding material through channel 28 and into valve stem channel 32. However, with valve stem 12 in the retracted position as shown in FIG. 3, molding material is allowed to flow through channel 28 into valve stem channel 32 which also leads into mold plate 22. Upon closing the valve, valve stem channel 32 extends to a position relatively close to injection gate orifice 33, thereby assuring a true center location of the valve stem in the gate and avoiding undue wear caused by valve stem bending or flexing during the closing of the valve stem.

Actuation of valve stem 12 in a reciprocating manner for opening and closing the flow path of the molding material from channel 28 into valve stem channel 32 is accomplished via the sliding movement of piston 14 against sleeve 13. Piston 14 is set into motion by the use of pressurized air directed into ports 34 and 36 which extend through mold manifold plate 18 in fluid communication with the outer surface of cylindrical piston 14. An annular space 38 is located between bore 24 and sleeve 13 for the movement therein of piston 14. However, in order to direct the fluid against the outer surface of the piston, the piston is necessarily not entirely cylindrical in shape.

The piston is essentially annular in shape, including a first and second wall thickness wherein the first wall thickness at the ends of piston 14 is substantially half the width of the annular space 38 and at the middle portion of piston 14, the wall is substantially equivalent in width to the annular space such that the central portion slidably engages bore 24. The differing widths form walls 39a and 39b on which the fluid or air can be directed. Accordingly, when pressurized air is directed into ports 34 and 36, the air is directed into the annular space not occupied by piston 14. In order to place the valve gated system in the closed position as shown in FIG. 1, air is directed into port 34 against wall 39a and in order to place the valve gated system in the open position as shown in FIG. 3, air is directed into port 36 against valve 39b.

Because the piston is of annular design, it cannot achieve the same force as a solid piston under equal air pressures, for a given outside diameter. Consequently, to achieve an equivalent force, the air pressure must be increased. Alternatively, the outside diameter of the annular piston can be increased in size to provide the equivalent force under the same air pressures used for solid pistons. Such an increase in diameter will not cause the piston to become prohibitively large or space consuming, typically requiring an increase in outside diameter of only approximately one third the diameter of a solid piston. In comparison to the prior art of the assembly of the present invention, as a whole, remains substantially more compact.

Piston 14 also includes a series of seals 40a and 40b, and 42a and 42b, wherein seals 40a and 40b are positioned between the outer surface of piston 14 and bore 24 and seals 42a and 42b are positioned between the inner surface of piston 14 and sleeve 13. The seals function to allow pressure build-up in annular space 38 on each end of piston 14 for moving the same through the annular space for opening and closing the valve gated system. Due to the construction of sleeve 13 and other cooling features discussed below, seals 40a and 40b and seals 42a and 42b can be typical O-ring seals, not requiring special materials for withstanding high temperatures.

Valve stem 12 is reciprocated through nozzle housing 16 via a mechanical attachment between piston 14 and valve stem 12. That is, a cross bar 44 extends from piston 14 inwardly through an opening 46 in sleeve 13 and into a cavity 48 in nozzle housing 16. Upon the movement of piston 14 through annular space 38, cross bar 44 is also moved through opening 46 and cavity 48 and due to the connection of bar 44 with valve stem 12, valve stem 12 is moved with the movement of piston 14. Within cavity 48, a cap 50 is attached to cross bar 44 and is adapted to engage a back wall 52 (See FIG. 1) upon a complete opening stroke of the piston, as shown in FIG. 3. Referring back to FIG. 1, piston 14 is limited to a stroke of a "A" which is essentially the size of opening 46 and the length of the space between cap 50 and back wall 52. Stroke "A" is designed at a distance such that valve stem 12 is moved substantially out of the flow stream of channel or channels 28 so that a weld seam is avoided.

Sleeve 13, coaxially positioned relative to nozzle housing 16, functions to guide piston 14 adjacent nozzle housing 16 and also functions to align nozzle housing 16 centrally within bore 24 through mold manifold plate 18. Preferably, sleeve 13 is formed from a material having low thermal conductivity properties, such as ceramic. By using a material of low thermal conductivity, heat generated in nozzle housing 16 of system 10 can be maintained confined to the nozzle housing area. That is, because the material comprising the sleeve will not conduct heat well, heat is not transferred from nozzle housing 16 to the outside area which includes piston 14, seals 40 and 42, and annular space 38. Because of this property of sleeve 13, seals 40 and 42, as discussed above, can be constructed from a material which does not have to be substantially heat resistant.

By constructing sleeve 13 from a material having low thermal conductivity, the piston seals 40 and 42 will operate at lower temperatures and perform over a longer period of time. A temperature drop of 50° F. may be sufficient to allow the seal to operate for such an extended period. To achieve this drop, the sleeve is constructed from materials such as, for example, ceramic or titanium alloy. These materials possess a thermal conductivity of much less than 10 BTU/ft hr F.°, typical of steels generally used, thereby reducing the temperature of the seals to suitable values.

During the processing of certain molding materials or plastics through the hot runner valve gated system 10 of the instant invention, minute amounts of plastic processing byproducts may make their up the valve stem channel 32. For such a case, a drainage channel 54 has been provided which leads to a free air space such as the one between hot runner manifold 31 and mold manifold plate 18. At this space, the byproducts have ample room to collect before requiring a periodic clean out. In addition, the byproducts are prevented from progressing further up the valve stem bore and impeding the operation of piston 14 and bar 44.

Figure 4:
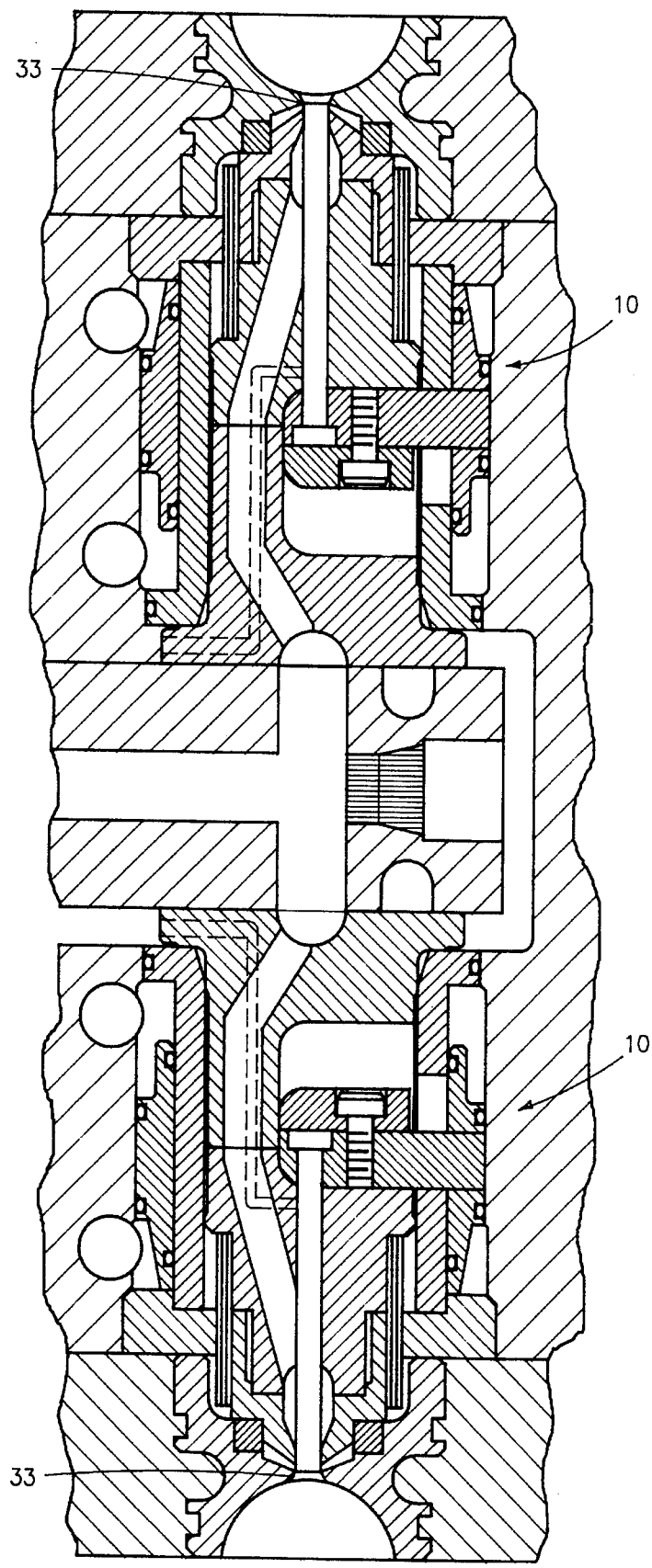
FIG. 4 is an overhead and cross-sectional view of the valve gated system of the present invention used in a stack mold arrangement.

An advantageous application of the system 10, described above, is shown in FIG. 4 for use with a stack mold design. The simplicity of this design in comparison to the prior art discussed above can be readily appreciated by reviewing the figures of the present invention. The savings in space offered by the compact design of the system of the instant invention allows a stack mold to fit into tight capacities, allowing greater flexibility and efficiency on the production floor of the molder. Also, because of the reduction in distance between opposing cavity gate orifices 33 for stack molds, the novel design allows closer spacing of the molding cavities as compared to the prior art. The cavities may be spaced at a pitch slightly greater than the overall diameter of the nozzle housing assembly itself.

Figure 5:
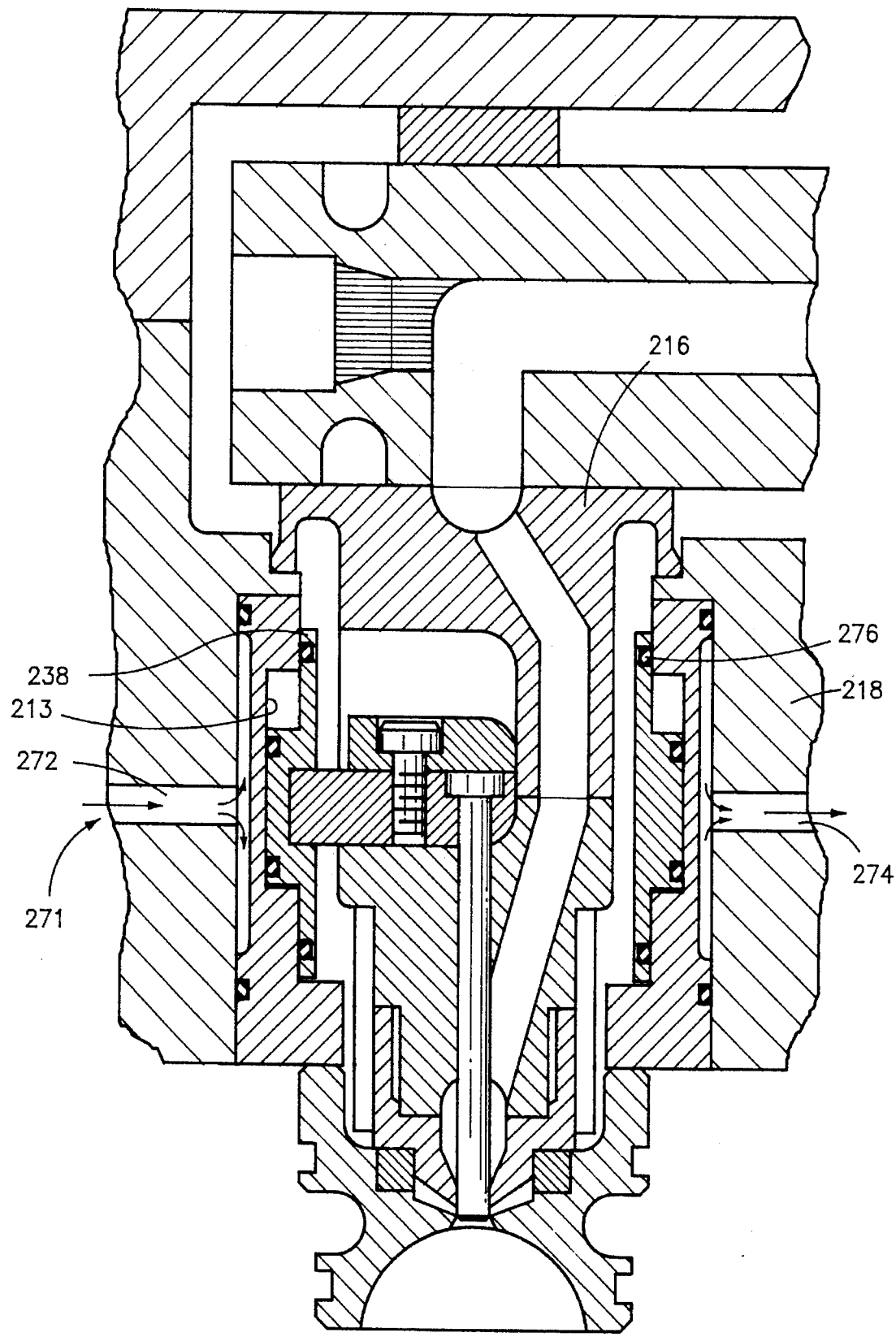
FIG. 5 is an overhead, cross-sectional and cutaway view of another embodiment for cooling the valve gated system of the present invention.

Another embodiment of the invention is shown in FIG. 5, wherein the means for maintaining the means for reciprocating in a cooled state include cooling channels. The cooling channels are placed between the mold manifold plate and sleeve 213. Accordingly, at various points along the length of nozzle housing 216, a coolant is introduced into a port 271 through a channel 272 and into an annular space 238 between mold manifold plate 218 and sleeve 213. The fluid is removed from the other side of nozzle housing 216 through channel 274. In this manner, a more direct cooling of seals 276 can be achieved.

In the embodiments described above in FIGS. 1–5, the system is preferably installed into mold or manifold plate 18 from the front, i.e., the side defined by front surface 26. That is, the nozzle assembly can be inserted from surface 26 of manifold plate 18. This feature provides for easier maintenance when required, as plates 18 and 20 do not have to be separated for access or removal of the nozzle assembly from the rear surface. Accordingly, with this design, the manifold can remain between the mold plates and not be disassembled.

In operation, and in order to move the gate valve system from the closed position in FIG. 1 to the open position in FIG. 3, pressurized air is introduced into port 36 against wall 39b of piston 14. The pressurized air functions to move the piston 14 through the annular space 38 until cap 50 collides with the wall 52 of cavity 48 in nozzle housing 16. At this point, valve stem 12 is retracted from gate orifice 33, as shown in FIG. 3 and molding material can be introduced through channel or channels 28 and into the end of valve stem channel 32. Accordingly, the molding material is directed into valve gate orifice 33 and into the mold. Because the molding material must flow smoothly through channel or channels 28 nozzle housing 16 is heated for maintaining viscosity.

Sleeve 13, constructed from the low thermal conductivity material, functions to confine that heat produced in nozzle housing 16 to the area surrounding nozzle housing 16 and does not conduct the heat outwardly to piston 14. Accordingly, seals 42a and 42b do not become warmed by the heat and have a longer life span. In addition, special and expensive seals which can withstand high temperatures do not have to be used. If along with using sleeve 13, the embodiment of FIG. 5 is used, wherein coolant is passed through cooling channels, the coolant is circulated through the channels during and prior to the introduction of the molding material into the nozzle housing for maintaining the piston and seals at a relatively cool temperature.

The primary advantage of this invention is that a space efficient mechanically actuated valve gated system is provided. Another advantage of this invention is that a mechanically actuated valve gated system is provided which is designed for being self-cooling so as to reduce wear of heat sensitive parts. Yet another advantage of this invention is that a mechanically actuated valve gated system is provided which functions to alleviate weld lines. Yet another advantage of this invention is that a mechanically actuated valve gated system is provided having a motive means coaxially positioned with the nozzle housing for acquiring a space efficient design. And still another advantage of this invention is that a valve gated system is provided which is particularly useful for stack mold arrangements due to the space efficient design of the system.

It is apparent that there has been provided in accordance with this invention a improved gate valve which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A hot runner valve gated system which directs melt from a melt channel to a mold cavity, comprising:
    at least one housing adapted to be positioned in a mold plate, the housing including a gate orifice adapted to be positioned adjacent the mold cavity and a channel means extending therethrough and in communication with said melt channel for directing melt to the orifice;
    a reciprocal valve stem positioned within the housing;
    means for reciprocating the valve stem positioned adjacent the housing for opening and closing the gate orifice; and
    means for maintaining the means for reciprocating in a substantially cooled state, said means for maintaining including a sleeve adjacent the means for reciprocating, wherein said housing is positioned coaxially within said sleeve, and wherein said sleeve has at least one opening therein and including an attachment between the means for reciprocating and the valve stem extending through said opening in the sleeve.

2. The hot runner valve gated system according to claim 1, wherein the means for reciprocating comprises a piston adapted to be driven through a piston stroke by a compressed fluid, the piston being positioned coaxially relative to the housing.

3. The hot runner valve gated system according to claim 2, wherein the piston includes a first surface adjacent the housing and a second surface adapted to be positioned adjacent the mold plate.

4. The hot runner valve gated system according to claim 3, wherein a first seal is formed between the piston and the housing and a second seal is formed between the piston and the mold plate.

5. The hot runner valve gated system according to claim 2, wherein the piston includes means for stopping the piston adapted to cooperate with the housing for terminating the stroke.

6. The hot runner valve gated system according to claim 5, wherein the housing includes an opening defined by a wall, and wherein the piston is substantially cylindrical having an inner surface adjacent the housing and wherein the means for stopping comprises a bar extending from the piston and into the opening of the housing, the bar including a portion adapted to engage the wall for terminating the piston stroke.

7. The hot runner valve gated system according to claim 1, wherein the piston stroke is sufficient in distance to substantially remove the valve stem from the flow path of the melt such that weld lines are not formed.

8. The hot runner valve gated system according to claim 1, wherein the means for reciprocating includes means for creating a seal located between the means for reciprocating and the mold plate, wherein the means for maintaining is also adapted to cool the means for creating a seal.

9. The hot runner valve gated system according to claim 8, wherein the means for creating a seal is further located between the means for reciprocating and the means for maintaining.

10. The hot runner valve gated system according to claim 9, wherein the sleeve is positioned between the means for reciprocating and the housing, the sleeve being formed from a material of low thermal conductivity such that a substantial amount of the heat from the housing is not conducted through the sleeve and is substantially separated from the means for creating a seal.

11. The hot runner valve gated system according to claim 10, wherein the sleeve material is ceramic.

12. The hot runner valve gated system according to claim 10, wherein the sleeve material is a titanium alloy.

13. The hot runner valve gated system according to claim 2, wherein the means for maintaining further comprises an air space positioned between the piston and the housing.

14. The hot runner valve gated system according to claim 1, comprising two sets of elements, each set including at least one of said housing, said reciprocal valve stem, said means for reciprocating and said means for maintaining, wherein the two sets are positioned opposite each other in a stack mold arrangement and share a common melt channel.

15. The hot runner valve gated system according to claim 1, wherein the mold plate includes a rear surface adjacent a manifold and a front surface, the housing and the means for maintaining adapted to be positioned in the mold plate and removable from the mold plate through the front surface for allowing easy access to the housing, the means for maintaining, the valve stem and the means for reciprocating.

16. The hot runner valve gated system according to claim 1, wherein said means for reciprocating is a piston including an inner surface and said sleeve includes an outer surface, and wherein the inner surface of the piston slidably engages the outer surface of the sleeve.

17. The hot runner valve gated system according to claim 16, including means for actuating the piston extending through the mold plate.

18. The hot runner valve gated system according to claim 1, wherein the means for reciprocating comprises an annular piston.

19. The hot runner valve gated system according to claim 18, wherein the annular piston has a central portion and end portions thereof, and wherein said annular piston has differing first and second wall thicknesses, with the wall thickness at the end portions being less than the wall thickness at the center portion.

20. The hot runner valve gated system according to claim 1, including a cavity in the housing, wherein said attachment is a mechanical attachment which extends from the means for reciprocating through said opening in the sleeve and into said cavity.

21. The hot runner valve gated system according to claim 1, wherein said means for reciprocating is a piston, and including an annular space between the sleeve and mold plate, wherein said piston reciprocates in said annular space.

22. The hot runner valve gated system according to claim 1, wherein said sleeve is operative to guide the means for reciprocating adjacent the housing and to align the housing within the mold plate.

* * * * *